E. R. DRAVER.
FEED REGULATOR.
APPLICATION FILED JULY 26, 1919.

1,372,869.

Patented Mar. 29, 1921.
2 SHEETS—SHEET 1.

INVENTOR.
EMIL DRAVER.
BY HIS ATTORNEYS.
Williamson Merchant

E. R. DRAVER.
FEED REGULATOR.
APPLICATION FILED JULY 26, 1919.
1,372,869.
Patented Mar. 29, 1921.
2 SHEETS—SHEET 2.
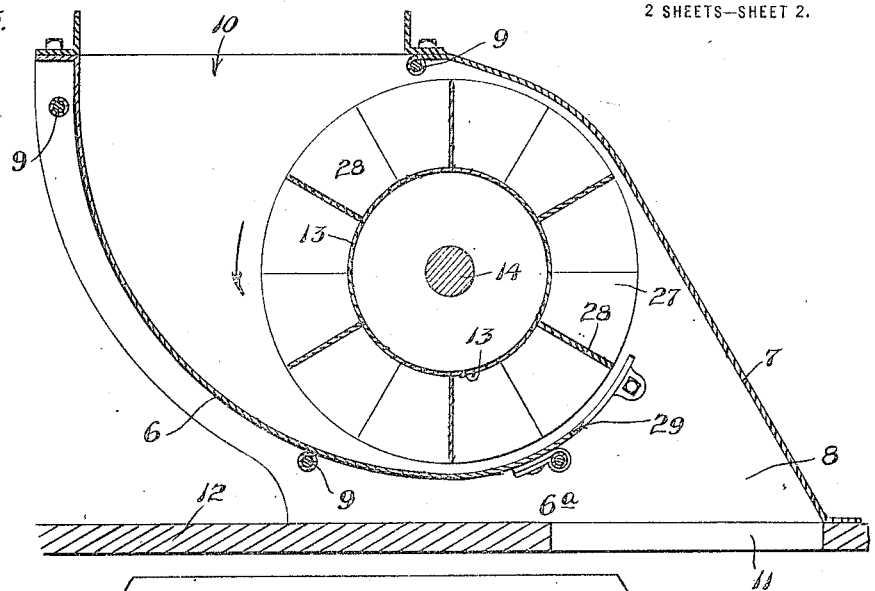
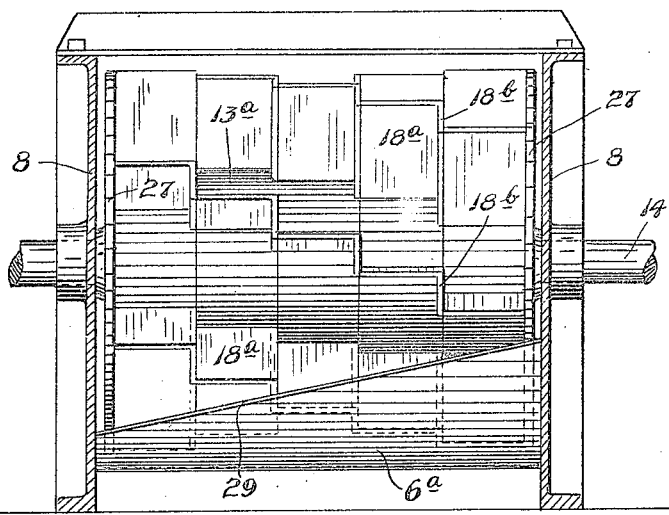
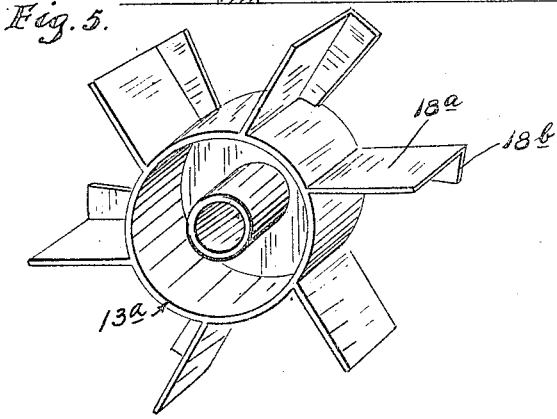
INVENTOR.
EMIL DRAVER.
BY HIS ATTORNEYS.

UNITED STATES PATENT OFFICE.

EMIL R. DRAVER, OF RICHMOND, MINNESOTA.

FEED-REGULATOR.

1,372,869.  Specification of Letters Patent.  Patented Mar. 29, 1921.

Application filed July 26, 1919. Serial No. 313,561.

*To all whom it may concern:*

Be it known that I, EMIL R. DRAVER, a citizen of the United States, residing at Richmond, in the county of Wayne and State of Minnesota, have invented certain new and useful Improvements in Feed-Regulators; and I do hereby declare the following to be a full, clear, and exact description of the invention, such as will enable others skilled in the art to which it appertains to make and use the same.

My present invention relates to feed regulators and in the nature of an improvement on the feed regulator disclosed and claimed in my prior Patent 1,307,349 of date, June 24, 1919.

Generally stated, the invention consists of the novel devices and combinations of devices, hereinafter described and defined in the claim.

Feed devices of the character herein considered are especially adapted for use in gangs, to commingle or blend together, various different materials, such for example, as different grades or kinds of flour or different kinds or grades of grains or cereal products.

The present invention is illustrated in the accompanying drawings, wherein like characters indicate like parts throughout the several views.

Referring to the drawings:

Fig. 3 is a section taken on the line 3—3 of Fig. 2;

Fig. 4 is a view corresponding to Fig. 2, but illustrating the somewhat modified form of certain of the elements, and some parts being broken away; and Fig. 5 is a perspective view showing one of the drum elements of the construction illustrated in Fig. 4.

Figure 1:
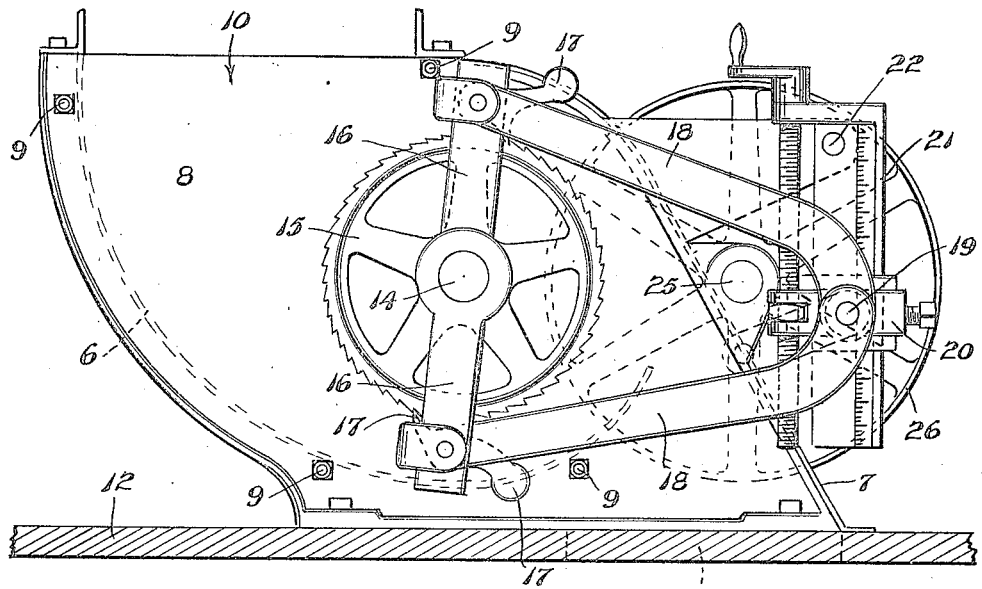
Figure 1 is a side elevation of the improved feeder or feed regulator.

The material is fed through a casing made of sheet metal plates 6 and 7 and side plates 8, which side plates are preferably cast and rigidly clamped to the plates 6 and 7, by suitable bolts 9. The casing thus formed has a large inlet passage 10 at its top, and at its bottom has a large discharge passage 11. The casing is shown as mounted on a floor or flat support 12.

Mounted to rotate within the casing, is a feed drum 13, the shaft 14 of which is journaled in and projects through suitable bearings on the side plate 8 of the casing. This drum is adapted to be rotated by any suitable means, but as shown, it is arranged to be rotated by the following devices:

A large ratchet wheel 15 is secured on one projecting end of the drum shaft 14. Arms 16 are pivoted on the shaft 14 and provided with reversely acting ratchet dogs 17 that operate on the teeth of the ratchet wheel 15. The free ends of the arms 16 are pivoted to the ends of links 18, which links are connected by a common pivot 19 to a cross head 20 mounted to slide on an arm 21, which arm oscillates on a pivot 22. Oscillatory arm 21 is given its movement through a link 23 that connects the same to a driving crank 24 that is carried by one end of a driving shaft 25 journaled in the side plates 8 and equipped with a pulley 26. The pivot 22 for arms 21, as shown in the form of a shaft is mounted in suitable bearings on the ends of the side plates 8.

The feed drum 13 is provided with circumferentially spaced pockets formed by end flanges or plates 27 on the ends of the drums and longitudinal pocket-forming partition flanges 28 that are secured at their ends to said ending plates 27. The longitudinal flanges 28 extend obliquely in respect to planes that mediate from the axis of the drum and preferably they are spirally disposed and are parallel.

Figure 2:
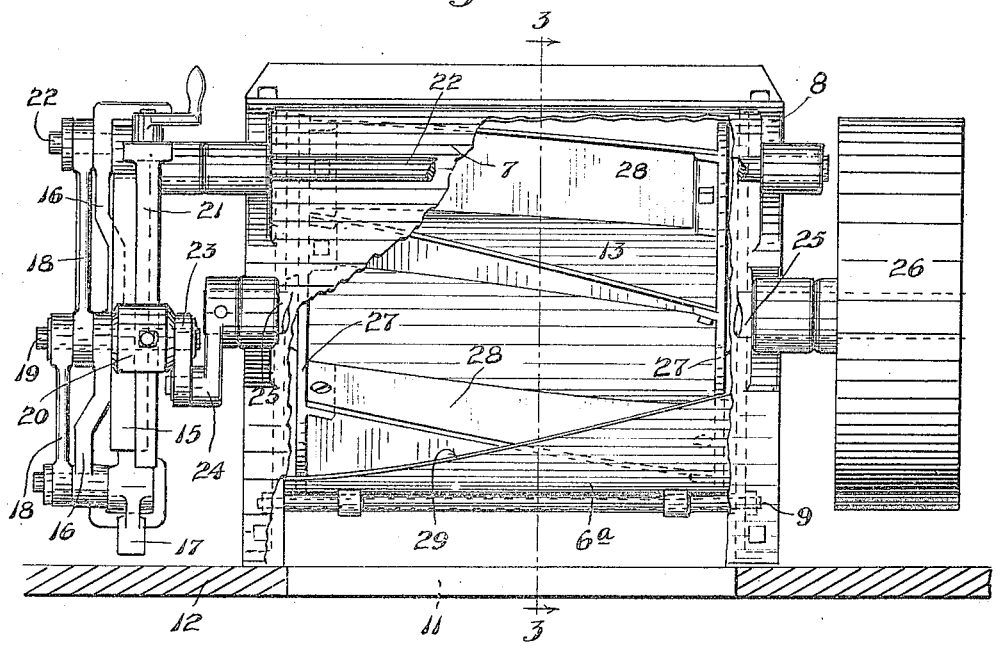
Fig. 2 is a front elevation of the feed regulator, some parts being broken away.

In the feeding action, the drum is arranged to rotate in a direction of the arrow, marked thereon in Fig. 3, so that the stock will be carried under the drum. The lower end of the plate 6 is curved to form a portion 6ᵃ that approximately follows the lower portion of the outer-most part of the drum and terminates at the oblique delivery edge 29. As a highly important feature of this invention, the oblique delivery edge 29 is made oblique in a direction reverse from the trend of the drum flanges 28, (see particularly note Fig. 2, which shows the manner in which the oblique flanges 28 cross the oblique delivery edge 29.) Here it may be noted that the flanges 28 and delivery edge 29 are reversely oblique to such an extent that the said oblique delivery edge 29, in numerous positions to the drums will extend from the left-hand end of one flange 28 to the right-hand end of the adjacent flange 28.

This gives a very deep pocketable or chamber formation around the drums between partition flanges 28 and within or above the extended bottom surface 6ª. The reverse obliquity of the partitions 28 and delivery edge 29 of the casing are very important for the above noted reasons that they afford deep pockets for holding material in the feeding action. Moreover, the materials from these pockets will be delivered or discharged progressively from one side of the drum toward the other, so that the pockets will not dump intermittently, but will feed a continuous stream. Moreover, the material from one pocket of the drum will begin at discharge before the material has been completely discharged from the pocket head thereof.

Preferably, the oblique partitions or flanges 28 and the oblique discharge edge 29 are made on unbroken lines, but these lines may be cut irregular or broken, as long as they are given the general trend and have the above noted general oblique relations to each other.

As an illustration of what has just been stated, Figs. 4 and 5 show the drum made up of a plurality of sections, 13ª having projecting partitions forming blades 18ª formed with flanges 18ᵇ at one edge. These drum sections are put together on shaft 14, so that their blades 18ª with flanges 18ᵇ form oblique longitudinal partitions that are serrated or stepped, as best shown in Fig. 4.

These reversely oblique relations of the longitudinal partitions of the drum or rotary feed elements and the edge of the delivery plate or portion of the casing, are considered broadly new, and hence I desire to claim the same broadly.

For the feeding of flour and some other materials, I find that the best results can be obtained by rotating the drum in a direction to carry the material under the drum in delivery action. With the drum arranged to deliver in this manner over the oblique delivery edge of the casing, the pockets of the drum are upside-down during the discharging action so that the material therein contained will have the freest kind of discharge under the action of gravity. This is especially advantageous when handling finely ground or fine materials, such as flour, which will have a tendency to pack and stick and which would not flow freely over the upper edge of a pocket at the top of the drum. The efficiency of the above device has been demonstrated in practice.

What I claim is:

A feed device comprising a casing having inlet and discharge passages, and a drum rotatably mounted in said casing, said drum having pocket-forming longitudinal flanges and said casing having a discharge edge adjacent to each discharge passage, said discharge edge and the longitudinal flanges of said drum being reversely oblique but at approximately the same angle to a plane that radiates from the axis of said drum.

In testimony whereof I affix my signature in presence of two witnesses.

EMIL R. DRAVER.

Witnesses:
  CLARA DEMAREST,
  BERNICE G. BAUMANN.